May 19, 1964 K. M. KIMMELL 3,133,593
VALVE COUPLER

Filed May 31, 1961 3 Sheets-Sheet 1

INVENTOR
KENNETH KIMMELL

BY Elton H. Brown, Jr.
AGENT

May 19, 1964

K. M. KIMMELL 3,133,593

VALVE COUPLER

Filed May 31, 1961

3 Sheets-Sheet 2

INVENTOR
KENNETH KIMMELL

BY Elton H. Brown, Jr.

AGENT

May 19, 1964

K. M. KIMMELL 3,133,593

VALVE COUPLER

Filed May 31, 1961

3 Sheets-Sheet 3

INVENTOR
KENNETH KIMMELL

BY Elton H. Brown Jr.

AGENT

United States Patent Office 3,133,593
Patented May 19, 1964

3,133,593
VALVE COUPLER
Kenneth M. Kimmell, Midwest, Wyo., assignor to J. M. Huber Corporation, Locust, N.J., a corporation of New Jersey
Filed May 31, 1961, Ser. No. 113,895
2 Claims. (Cl. 166—92)

The present invention relates to a valve coupler for oil well tubing.

The primary object of the invention is to provide a valve coupler for oil well tubing which can be quickly attached and detached without the use of tools.

Another object of the invention is to provide a valve coupler which can be used for attaching valves to oil well tubing while fluid is flowing from the tubing.

A further object of the invention is to provide a valve coupler of the class described above which can be adjusted to improve the sealing relation between the tubing and the coupler.

Figure 1:
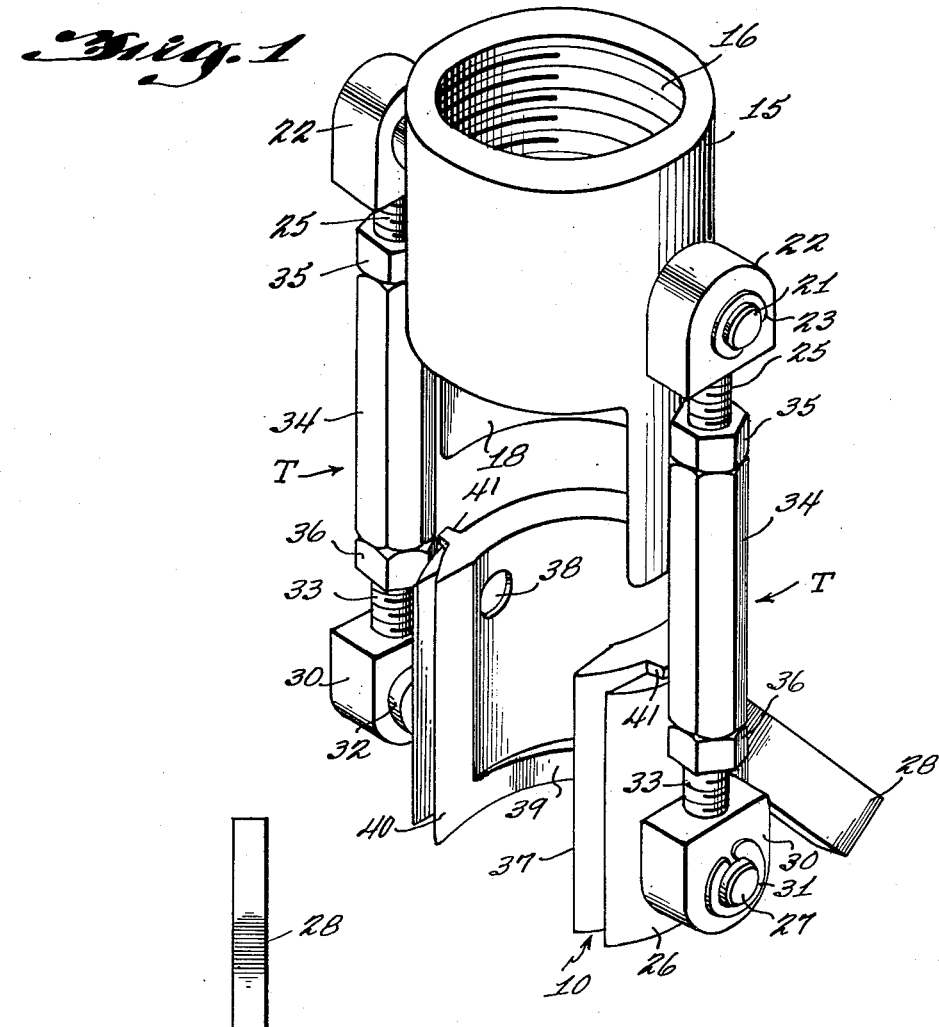
Figure 2:
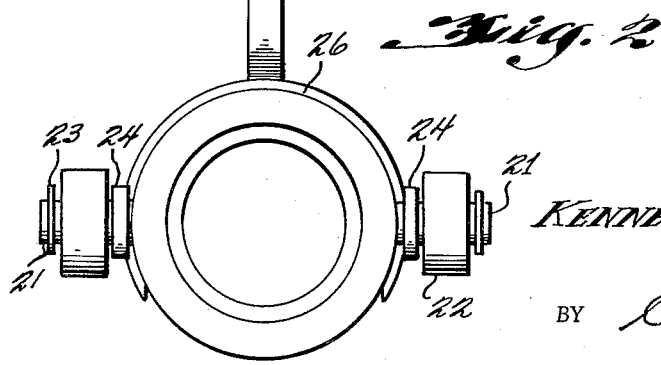
Figure 3:
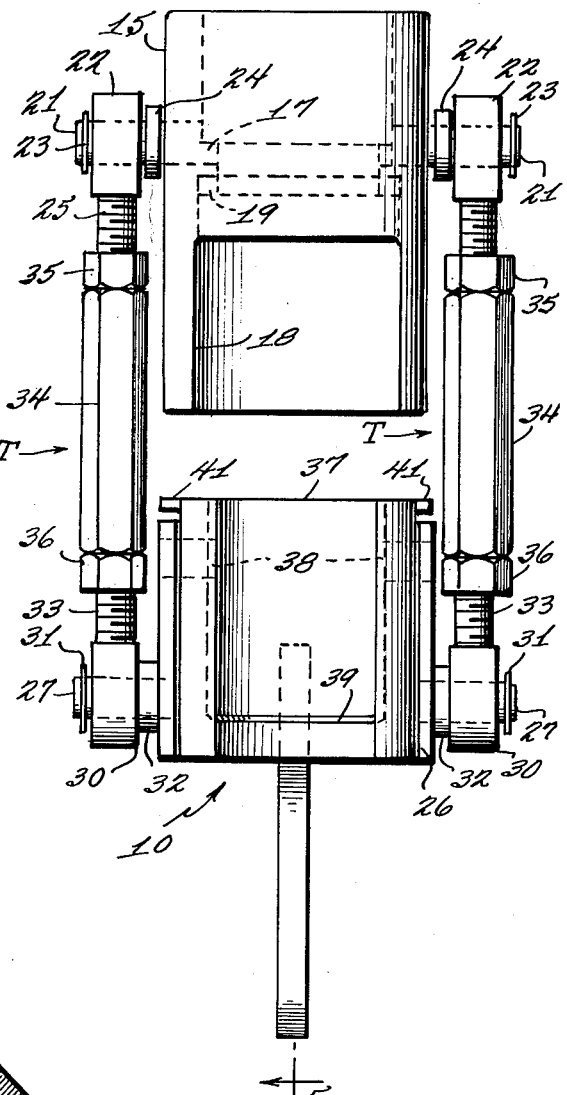
Figure 4:
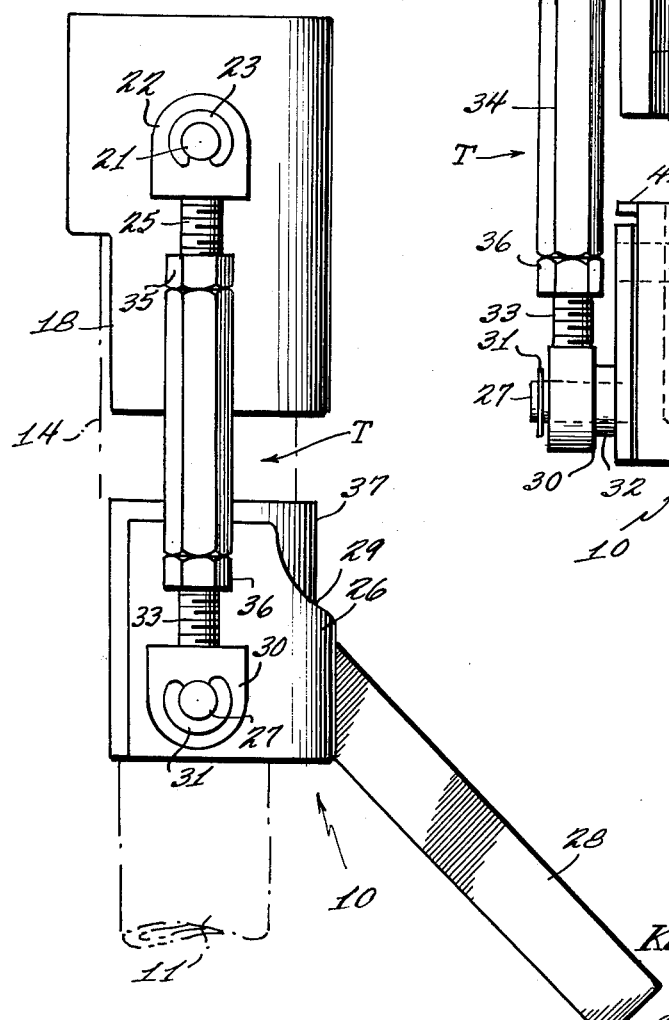
Figure 5:
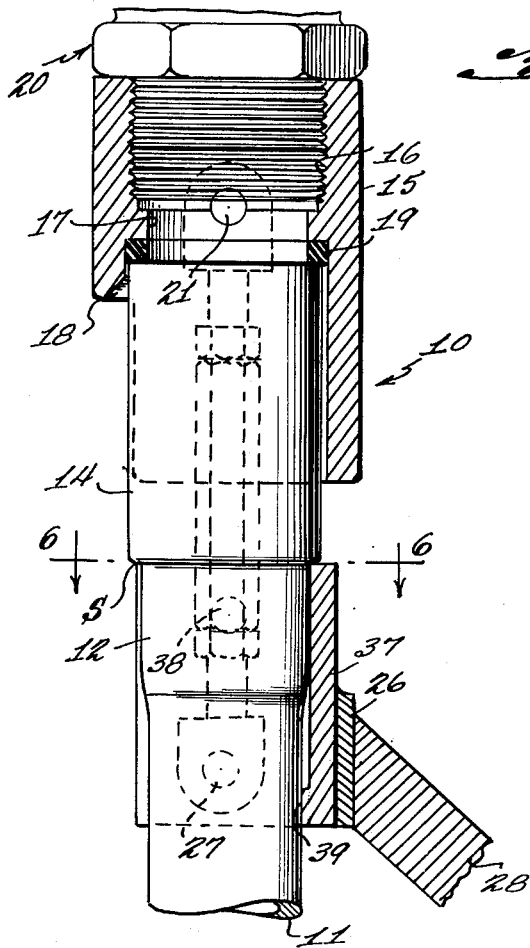
Figure 6:
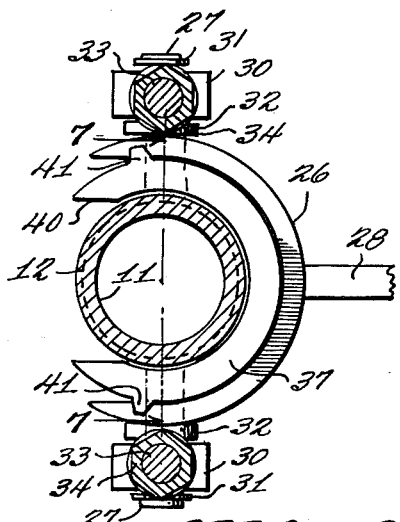
Figure 7:
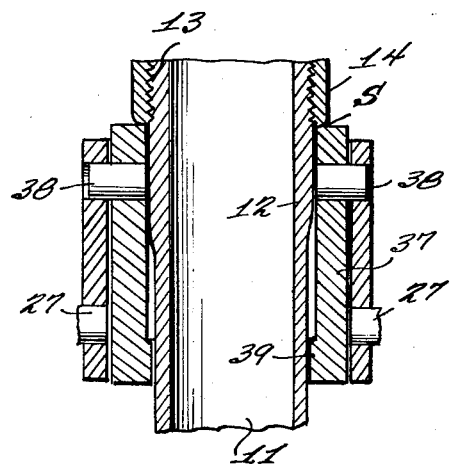

Other objects and advantages will become apparent in the following specification when considered in light of the attached drawings in which:

FIGURE 1 is a perspective view of the invention;
FIGURE 2 is a top plan view of the structure shown in FIGURE 1;
FIGURE 3 is a front elevation of the invention;
FIGURE 4 is a side elevation of the invention;
FIGURE 5 is a vertical sectional view taken in line 5—5 of FIGURE 3 looking in the direction of the arrows with parts broken away for convenience of illustration.
FIGURE 6 is a horizontal sectional view taken on line 6—6 of FIGURE 5 looking in the direction of the arrows; and
FIGURE 7 is a fragmentary vertical sectional view taken on line 7—7 of FIGURE 6 looking in the direction of the arrows.

In the working over of oil wells, it is often necessary to pull the tubing in order to permit maintenance operations to be performed. During the pulling of the tubing, after the upper end of the tubing has been disconnected from the flow line, conditions often change in such a way that oil and/or water flows through the tubing and spills out on the wellhead. When this occurs, the operator attempts to mount a valve into the internally threaded collar on the upper end of the uppermost section of tubing. If he is successful, the valve is then connected by flexible line to a flow line to bleed off the oil or water until the pressure reduces, or the flexible line is connected to a mud or water pump to permit pressure to be brought to bear on the fluids in the well to "kill" the well. Obviously, the attaching of a valve to the tubing by threading it into the collar is at best an extremely messy operation and, under some conditions of pressure, is virtually impossible. The present invention provides means for quickly attaching a valve to the tubing under any conditions of pressure encountered in oil wells with a minimum of spillage on the wellhead.

The coupler according to the present invention may also be used for temporarily and quickly coupling one end of a pipe or other tubing to pressure testing equipment to permit pressure tests to be conducted thereon.

Referring now to the drawings in detail wherein like reference characters indicate like parts throughout the several figures, the reference numeral 10 indicates generally a valve coupler constructed in accordance with the invention.

The valve coupler 10 is used on the upper end of a section of tubing 11 which is upset at 12 to produce a thicker wall portion having external threads 13 formed on the upper end thereof. The upset portion 12 of the tubing 11 has an external diameter considerably greater than the external diameter of the major portion of the tubing. A cylindrical internally threaded collar 14 is threaded onto the threads 13 of the tubing 11 so that the upper half of the collar 14 is free to receive the threaded end of the next section of tubing 11. The connection of the collar 14 to the tubing 11 forms a shoulder S as can be clearly seen in FIGURES 5 and 7. The structure of the tubing 11 and its associated collar 14 is conventional and the valve coupler 10 used therewith is adapted to the dimensions of the specific tubing 11 and collar 14.

The valve coupler 10 includes an elongated hollow cylindrical body 15 having the upper end thereof internally threaded at 16. The body 15 has an annular shoulder 17 integrally formed therein at the lower end of the threads 16, intermediate the upper and lower ends of the body 15. The body 15 has an opening 18 formed in one side thereof extending from a point spaced slightly below the shoulder 17 through the lower edge of the body 15. The opening 18 has a side-by-side dimension equal to the internal diameter of the body 15.

An annular resilient sealing ring 19 is positioned in the body 15 in engagement with the lower edge of the shoulder 17 above the opening 18. A valve indicated generally at 20 in FIGURE 5, and broken away for convenience of illustration, is of conventional construction and is threaded into the threads 16 of the body 15. A pair of oppositely disposed aligned pivot pins 21 are rigidly mounted centrally on the body 15 above the lower edge of the shoulder 17 on opposite sides of the opening 18. A boss 22 is journaled on each of the pivot pins 21 and is secured thereon by a snap lock ring 23. A washer 24 is positioned on each of the pivot pins 21 between the boss 22 and the body 15 as can be seen in FIGURES 2 and 3.

A threaded shaft 25 is formed on each of the bosses 22 and extends downwardly therefrom perpendicularly to the pivot pins 21. An elongated generally U-shaped yoke 26 is arranged in axially aligned relationship to the body 15 in spaced relation therebelow. The yoke 26 has a pair of pivot pins 27 arranged in aligned oppositely disposed relationship rigidly secured thereto. A handle 28 is rigidly secured to the yoke 26 and extends downwardly and outwardly therefrom. The yoke 26 is recessed at 29 intermediate the opposite sides thereof overlying the handle 28.

A boss 30 is journaled on each of the pivot pins 27 and is secured thereon by lock ring 31. A washer 32 is mounted on each of the pivot pins 27 between the bosses 30 and the yoke 26. A threaded shaft 33 is rigidly formed on each of the bosses 30 extending perpendicularly to the pivot pins 27. The shafts 33 are threaded oppositely to the shafts 25 and each shaft 33 is connected to a shaft 25 by means of an elongated turnbuckle nut 34. Locknuts 35 on the shafts 25 engage the upper ends of the turnbuckle nuts 34 while locknuts 36 on shafts 33 engage their lower ends. The turnbuckle nut 34, lock nuts 35, 36, threaded shafts 25, 33 and bosses 22, 30 form when assembled a turnbuckle link T having its opposite ends journalled on the pivot pins 21, 27 respectively.

A generally U-shaped bushing 37 is positioned within the yoke 26 and is pivotally secured thereto by means of a pair of aligned pivot pins 38. The bushing 37 has an internal diameter slightly greater than the external diameter of the upset portion 12 of the tubing 11. A shoulder 39 is formed on the lower inner edge of the bushing 37 having an internal diameter less than that of the upset portion 12 of the tubing 11. An opening 40 is formed in the bushing 37 having a width equal to that of the internal diameter of the shoulder 39. The bushing 37 can be engaged over the tubing 11 below the upset portion 12 and then can be moved upwardly into engagement with the lower end of the collar 14 encompassing the upset portion 12 of the tubing 11. The width of the opening 40 being less than the diameter of the upset portion 12, the bushing 37 can only be removed from the tubing 11 by moving it axially of the tubing 11 out of engagement with the upset portion 12.

A pair of ears 41 are formed in outwardly extending relation on the upper edge of the bushing 37 for engagement with the upper edge of the yoke 26 to limit the pivotal movement of the bushing with respect to the yoke.

In the use and operation of the invention to attach the valve coupler 10 to a section of tubing 11, the valve coupler 10 is held in a generally upright position and the bushing 37 is engaged over the tubing 11 below the upset portion 12. The bushing 37 is then moved upwardly into engagement with the lower end of the collar 14 with opening 18 permitting the body 15 to move into alignment with the collar 14. The body 15 then drops to engage the seal 19 with the upper end of the collar 14. The handle 28 is swung downwardly and inwardly toward the tubing 11 so as to draw the body 15 downwardly into sealing engagement with the upper end of the collar 14. With the coupler 10 in attached position, as illustrated in FIGURE 5, the pivot pins 21 and 38 are on center while the pivot pins 27 are beyond the center so that an over dead-center lock action results to hold the coupler 10 in engagement with the tubing 11.

The construction of the bushing 37, with the opening 40 having a width less than the outside diameter of the upset portion 12 of the tubing 11, is such that the bushing 37 cannot move laterally off the tubing 11 without first being moved downwardly out of contact with the upset portion 12.

The turnbuckle nuts 34 provide an adjustment between the body 15 and the yoke 26 so that wear in the seal 19, as well as differences in the lengths of collars 14, may be compensated for easily.

In order to remove the coupler 10 from the tubing 11, the handle 28 is swung upwardly and outwardly, relieving the tension on the body 15. The body 15 is then removed from the upper end of the collar 14 and is swung out of alignment with the collar 14. The bushing 37 is then moved downwardly on the tubing 11 below the upset portion 12. The bushing 37 is then removed laterally from the tubing 11 freeing the coupler 10 completely from the tubing 11.

Having thus described the preferred embodiment of the invention, it should be understood that numerous structural modifications and adaptations may be resorted to without departing from the scope of the appended claims.

I claim:

1. A coupler for tubing of the type having an enlarged portion adjacent one end and having a cylindrical collar releasably secured to said one end with said enlarged portion having a diameter greater than said tubing and said collar having a diameter greater than said enlarged portion, said coupler comprising a generally cylindrical hollow body adapted to engage over the free end of said collar, a radially inwardly extending shoulder disposed in said hollow body intermediate the opposite ends thereof, an annular resilient seal mounted in said body and abutting an axially extending face of said shoulder for sealing engagement between said shoulder and the free end of said collar, a generally U-shaped bushing adapted to be moved radially into engagement about said tubing adjacent said enlarged portion, a yoke member disposed concentrically about said bushing, means pivotally connecting said yoke member to said bushing near the upper end of the bushing, a pair of diametrically disposed links pivotally secured at their upper ends to said cylindrical body and at their lower ends to said yoke member, said latter pivot axis being located on said yoke member below the pivot axis of the yoke member to the bushing, said bushing being slidable longitudinally over said enlarged portion into engagement with the other end of said collar, said bushing having a side opening greater than the diameter of said tubing and smaller than the diameter of said enlarged portion so constructed and arranged that lateral displacement of said bushing from said enlarged portion is prevented, and handle means on said yoke for swinging said yoke on said links and about the pivotal connection of said yoke to said bushing whereby said bushing and said body are moved into binding engagement with the opposite ends of said collar.

2. A device as claimed in claim 1 wherein said links are longitudinally adjustable to adapt said coupler to collars of various lengths.

References Cited in the file of this patent

UNITED STATES PATENTS

| 755,249 | Seals | Mar. 22, 1904 |
| 1,924,424 | Van Meter | Aug. 29, 1933 |
| 2,421,178 | Baker et al. | May 27, 1947 |

FOREIGN PATENTS

| 563,659 | Belgium | Jan. 15, 1958 |